US008657672B2

(12) United States Patent
Presch

(10) Patent No.: US 8,657,672 B2
(45) Date of Patent: Feb. 25, 2014

(54) ELECTRONIC GAMING DEVICE

(75) Inventor: Ryszard Presch, Gumpoldskirchen (AT)

(73) Assignee: NOVOMATIC AG, Gumpoldskirchen (AT)

(*) Notice: Subject to any disclaimer, the term of this patent is extended or adjusted under 35 U.S.C. 154(b) by 296 days.

(21) Appl. No.: 13/300,390

(22) Filed: Nov. 18, 2011

(65) Prior Publication Data

US 2012/0115583 A1 May 10, 2012

Related U.S. Application Data

(63) Continuation of application No. PCT/EP2010/003034, filed on May 18, 2010.

(30) Foreign Application Priority Data

May 18, 2009 (DE) ..................... 20 2009 007 113 U

(51) Int. Cl.
*A63F 13/00* (2006.01)

(52) U.S. Cl.
USPC .................. 463/25; 463/16; 463/20; 463/23; 463/42

(58) Field of Classification Search
USPC ................. 463/23, 16–20, 21, 22, 25, 40–42
See application file for complete search history.

(56) References Cited

U.S. PATENT DOCUMENTS 6,024,640 A * 2/2000 Walker et al. .................. 463/17

* cited by examiner

*Primary Examiner* — Ronald Laneau
*Assistant Examiner* — Ross Williams
(74) *Attorney, Agent, or Firm* — Levine Bagade Han LLP

(57) ABSTRACT

The present invention relates to an electronic gaming machine having a game server to which a gaming apparatus can be connected, wherein the game server has a ticket block including a plurality of electronic game tickets which are each individually characterized by a winning number combination, wherein the gaming apparatus can be connected to a credit store associated with it which can be loaded by an input apparatus and including a ticket purchasing apparatus for purchasing a game ticket while reducing the credit stored in the credit store. The gaming apparatus has a gaming device which can be actuated in dependence on a course of a game while using as the basis the data of the same game ticket in a plurality of game rounds from the credit store and then from a winnings store.

14 Claims, 3 Drawing Sheets

ELECTRONIC GAMING DEVICE

CROSS-REFERENCE TO RELATED APPLICATIONS

This application is a continuation of PCT Application No. PCT/EP2010/003034, filed 18 May 2010, which claims priority to German Application No. 20 2009 007 113.8, filed 18 May 2009, both of which are incorporated by reference herein in their entireties.

BACKGROUND

1. Field of the Invention

The present invention relates to an electronic gaming machine, in particular a lottery gaming machine, having a game server for controlling the game to which at least one gaming apparatus can be connected, wherein the game server has at least one game ticket block, preferably an electronic game ticket block, including a plurality of preferably electronic game tickets which are each individually characterized by a winning number combination, wherein the at least one gaming apparatus can be connected to a credit store associated with it which can be loaded by an input apparatus and including a ticket purchasing apparatus for purchasing a game ticket while reducing the credit stored in the credit store.

2. Description of the Related Art

Lottery gaming machines are known in various forms, also in electronic embodiments. Lottery gaming apparatus are shown, for example, in documents DE 295 16 968 U1 or U.S. Pat. No. 5,119,295. EP 0 639 998 also shows a similar gaming apparatus.

In the case of the named DE 295 16 968 U1, the lottery gaming machine is, however, limited to reading in a gaming ticket completed in writing by a scanner, to paying a stake in the form of cash or cashlessly by plastic money by a money input apparatus and to conversely paying out at least smaller winning amounts. The incentive to play and the entertainment value of the apparatus are, however, very limited. On the other hand, the data management, the determination of the winning lottery tickets and the display and paying out of the winnings are complicated since as a rule for this purpose the data read in by scanner have to be transformed, the winning numbers or symbols have to be checked separately and associated with the tickets or players and the paying out can optionally only be made with a long time delay.

SUMMARY OF THE INVENTION

It is therefore the underlying object of the present invention to provide an improved gaming machine of the named type which avoids disadvantages of the prior art and further develops said prior art in an advantageous manner. A draw of lottery winnings should preferably be achieved which is simple to process from a technical data aspect and has a high security against abuse while realizing a high incentive to play and a high entertainment value.

This object is achieved in accordance with the invention by an electronic gaming machine in accordance with claim 1. Preferred embodiments of the invention are the subject of the dependent claims.

It is therefore proposed to feed a gaming device provided at the gaming apparatus from different credit stores and winnings stores and in so doing optionally to use the same data of only one game ticket as the basis over a plurality of game rounds—depending on the course of the game. On the one hand, an improved, simplified data storage and data transfer is achieved with a nevertheless high incentive to play, wherein the gaming apparatus at which the draw of the winnings can be carried out can advantageously be indirectly or directly connected to a central game server in which the winning numbers or symbols associated with a game ticket to be purchased are stored. On the other hand, the development of a player's already used stake and his winnings made is displayed more clearly for the player. In accordance with the invention, the at least one gaming machine has a gaming device which can be actuated in dependence on a course of a game while using as the basis the data of the same game ticket in a plurality of game rounds from the credit store and then from a winnings store. If winnings are made in the first game, which can be started by and/or after purchasing a game ticket, a game round can again be started by staking these winnings or a portion thereof—in particular without reducing the credit in the credit store—while using as the basis the data of the same game ticket, whereby the data management is simplified without this having to be achieved by losses in the incentive to play. If winnings are again made in this respect or initial winnings are not used up, further game rounds can optionally be started from the winnings store, with the initially purchased game ticket or the winning symbols associated with it being able to be used further. If, in contrast, a loss is made in the first game round or if the initial winnings are lost in the further rounds, a further game ticket can be purchased while reducing the credit store and its new winning symbols are then used as the basis for the further game.

The gaming device, which can be actuated after and/or by the purchase of a game ticket held by the game server and which can be connected to a winnings store for storing winnings as well as to a display apparatus for displaying winnings, is advantageously designed such that it can only be actuated again on the basis of the same game ticket on achieving a win.

In this respect, the gaming device is advantageously connectable to a winning symbol generator for allocating a winning symbol combination, with a win control apparatus being provided for the automatic comparison of the allocated winning symbol combination with the winning symbol combination of the purchased game ticket and decreasing, increasing, locking and/or releasing the winnings stored in the winnings store by the first gaming device in dependence on the comparison of the winning symbols. If the gaming device is actuated after or by the purchase of a winning ticket, the gaming device writes any winnings achieved to the named winnings store. If, however, the credit released from the credit store for the purchase of the game ticket and thus activated for the game is wholly or partly lost by the gaming device, no winnings or only reduced winnings are naturally stored in the named winnings store so that a further game round using the purchased game ticket is blocked or is only made possible with a lower stake. If, however, winnings are stored and/or generated in the named winnings store by the gaming device, the gaming device is again activated for the already used game ticket so that the named gaming device can again be brought into interaction with the winning symbol generator to generate a winning symbol combination with reference to which the win control device increases, decreases, blocks, deletes and/or activates the winnings value stored in the winnings store. Alternatively, to simplify the data transfer, a plurality of winning symbol combinations can advantageously also already be input by the winning symbol generator in the first game and are then usable for the optionally activated further game rounds on the basis of the same game ticket for determining the result of the game in the further games activated from the winnings store.

In this respect, in an advantageous further development of the invention, the gaming device of the gaming apparatus can be designed differently, can in particular be controlled in different manners, with it having different control elements and/or being able to have a different display apparatus. The gaming device can in particular be designed as a reel gaming unit which can be controlled by a random generator and/or by a manually actuable control apparatus, in particular such that the stopping of the rotating reels is effected automatically in a randomly controlled manner and/or can be triggered solely or additionally by manual actuation of a brake or the like. The gaming device can, in a further development of the invention, also be designed as a lottery gaming unit, in particular as a ticket gaming unit, which is preferably actuable by a manual input apparatus, optionally alternatively or additionally also able to be set into motion automatically, in particular in dependence on a writing of the winnings store of the first gaming device.

In a further development of the invention, the gaming device can also have a plurality of differently designed gaming units which can be actuated in different game rounds and/or are connected either only to the credit store or only to the winnings store such that different gaming units can be used for playing different game rounds.

The previously named winning symbol generator can generally be accommodated at different points of the system. The named win control apparatus, which carries out the comparison between the winning symbol combination allocated by the winning symbol generator and the winning symbol combination of the respective purchased game ticket, can equally be accommodated at different points of the system. For example, both the winning symbol generator and the win control apparatus of the gaming apparatus can be accommodated separately in the game server so that these two components are protected from manipulations at the gaming apparatus itself. Alternatively, the winning symbol generator and the win control apparatus can also be provided in a decentralized manner, in particular at the gaming apparatus itself, which admittedly makes manipulations directly at the gaming apparatus easier, but on the other hand, so-to-say, prevents a large central manipulation for a plurality of gaming apparatus, in particular when a player making manipulation attempts does not know in which gaming apparatus these components are accommodated and/or when each gaming apparatus has its own winning symbol generator and/or its own win control apparatus.

In an advantageous further development of the invention, the two named components, i.e. the winning symbol generator and the win control apparatus, can also be integrated in separate control modules which are arranged at different locations and are advantageously designed connectable to one another via a data network, optionally also only via a data line. The named winning symbol generator can in particular be provided at the previously named game server, while the win control apparatus can be provided at the respective gaming apparatus and/or at a group server which is connectable thereto and which is connected between the gaming apparatus and the central game server. Security can be increased again by the accommodation at different locations and at different assemblies of the electronic gaming system and potential manipulations can be suppressed even better.

The communication between the gaming apparatus and the previously named game server at which the game tickets are held can generally be of different designs. In accordance with an advantageous embodiment of the invention, the at least one gaming apparatus can be directly connected to the central game server, preferably via a remote data connection so that the game server can be held at any desired location independently of the installation location of the gaming apparatus.

In a preferred further development of the invention, the at least one gaming apparatus can also only be indirectly connected to the central game server and/or can buy a game ticket held and/or generated by the central game server and can read in the winning symbol combination associated therewith. A group server to which the gaming apparatus is connected, preferably via a local network or a local network line, can in particular be interposed between the at least one gaming apparatus and the named game server. The named group server itself can in turn be connected to the central game server via a remote data line, optionally also in combination with further group servers via a global network or a network line. In a further development of the invention, the group server can be installed in a casino or at a gambling site in which a plurality of gaming apparatus are connected to the named group server. The group server can in turn then communicate with the central game server which is, for example, held by a gaming apparatus manufacturer at a location separate from the casino.

If a master game server and a group server which is a slave thereof are present, the memory structures in the different servers can advantageously be of different designs. The memory structure in which the game tickets and the winning symbol combinations associated with them are stored can in particular have different characteristics.

In a further development of the invention, the game server can hold, in one or more lottery ticket stores, a plurality of game ticket series which each include a plurality of game ticket blocks, preferably electronic game ticket blocks, which in turn include a respective plurality of different game tickets, preferably electronic game tickets, with which a respective winning symbol combination is associated.

When an interposed group server is used, a game ticket block distributor is advantageously provided which selects a respective game ticket block from the game series which are stored in the master game server and associates them with a local group server so that only one game ticket block is held in this local group server from each of the game ticket series of the master game server and the gaming apparatus connected at the local group servers can then download their game tickets from them. In a further development of the invention, a plurality of game ticket blocks can be held electronically in the local group server which, however, originate from different game ticket series which are held in the master game server.

The required number of held winning number combinations can be reduced while still ensuring a sufficiently long and intense game operation in a casino by such a structuring of the game ticket storage on different servers and by the association of the game ticket blocks from different series with a local server. In addition, the determination of whether a win is present or not can be streamlined in time since the number of winning symbol combinations to be compared can be reduced.

The configuration of the previously described game rounds which can be activated by a stake from the winnings store can generally differ with respect to the actuation and procedure control. In accordance with an advantageous embodiment of the invention, after the making of a win, the gaming device can only permit one additional game round or, alternatively, also a plurality of game rounds with which further wins correlated with the winning symbol combination of an already purchased game ticket can be drawn. In a further development of the invention, the gaming device has for this purpose a game round control means for controlling the number of game rounds which can be activated by a win from the first game device, with the named game round control means advantageously being able to work in dependence on different input signals. The number of game rounds can in particular be controlled in dependence on the number of purchased game tickets and/or in dependence on the credit held in the credit store and/or in dependence on the winnings stored in the winnings store. The named game control means can advantageously simultaneously take account of at least two of the named parameters and automatically determine the number of possible game rounds in dependence hereon.

In a further development of the invention, the gaming apparatus furthermore has, alternatively or additionally to the named game round control means, a stake control means for controlling the winnings of the first gaming device staked for a game of the second gaming device. This stake control means preferably has a manual input button which allows a manual determination of the amount of the stake. Alternatively or additionally, the input control means can also have a stake control module which can be controlled by the previously named game round control means in order automatically to increase the stake in dependence on the number of determined game rounds for the same game ticket, in particular such that an ever higher portion of the game winnings of the gaming device stored in the winnings stores is staked with further game rounds.

BRIEF DESCRIPTION OF THE DRAWINGS

The invention will be explained in more detail in the following with reference to a preferred embodiment and associated drawings. There are shown in the drawings.

DETAILED DESCRIPTION

Figure 1:
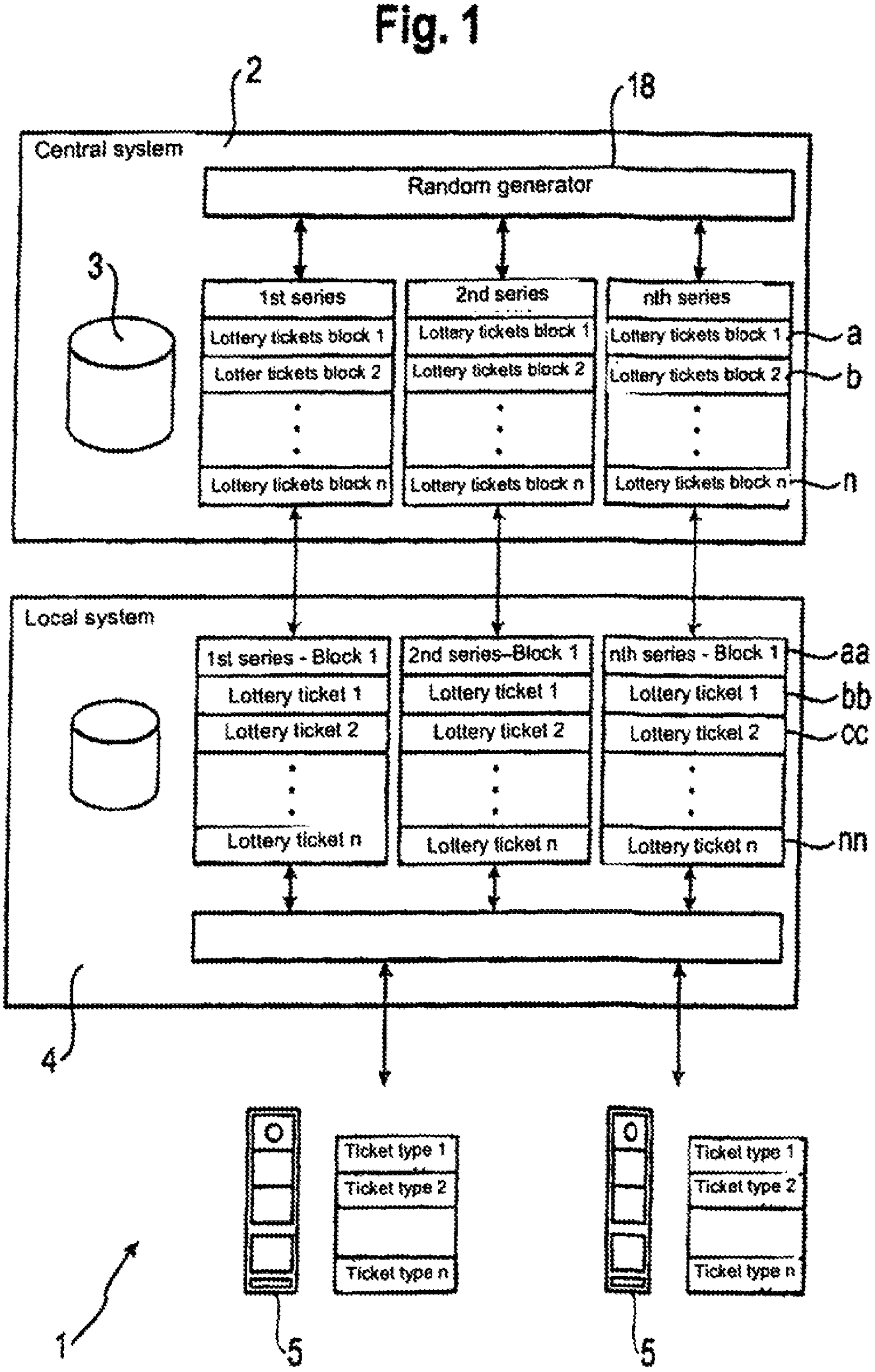
FIG. 1: a schematic representation of an electronic gaming machine having a plurality of gaming apparatus, a local group server and a central game server higher ranking than it.

In the embodiment drawn in FIG. 1, the gaming machine 1 includes a central game server 2 which has a central database 3 or storage device in which a plurality of game ticket series 1, 2 . . . n are stored of which each includes a plurality of game ticket blocks a, b . . . n. Each of these game ticket blocks a, b . . . n includes a plurality of electronic game tickets aa, bb, cc . . . nn. A winning symbol combination which is held and/or generated in the named game server 2 is associated with each of these electronic game tickets aa, bb, cc . . . nn. In this respect, at least within one game ticket block a, b, c . . . n, all collected game tickets aa, bb, cc . . . nn can advantageously be provided with an individual winning symbol combination, with this, however, not being an absolute requirement.

Figure 2:
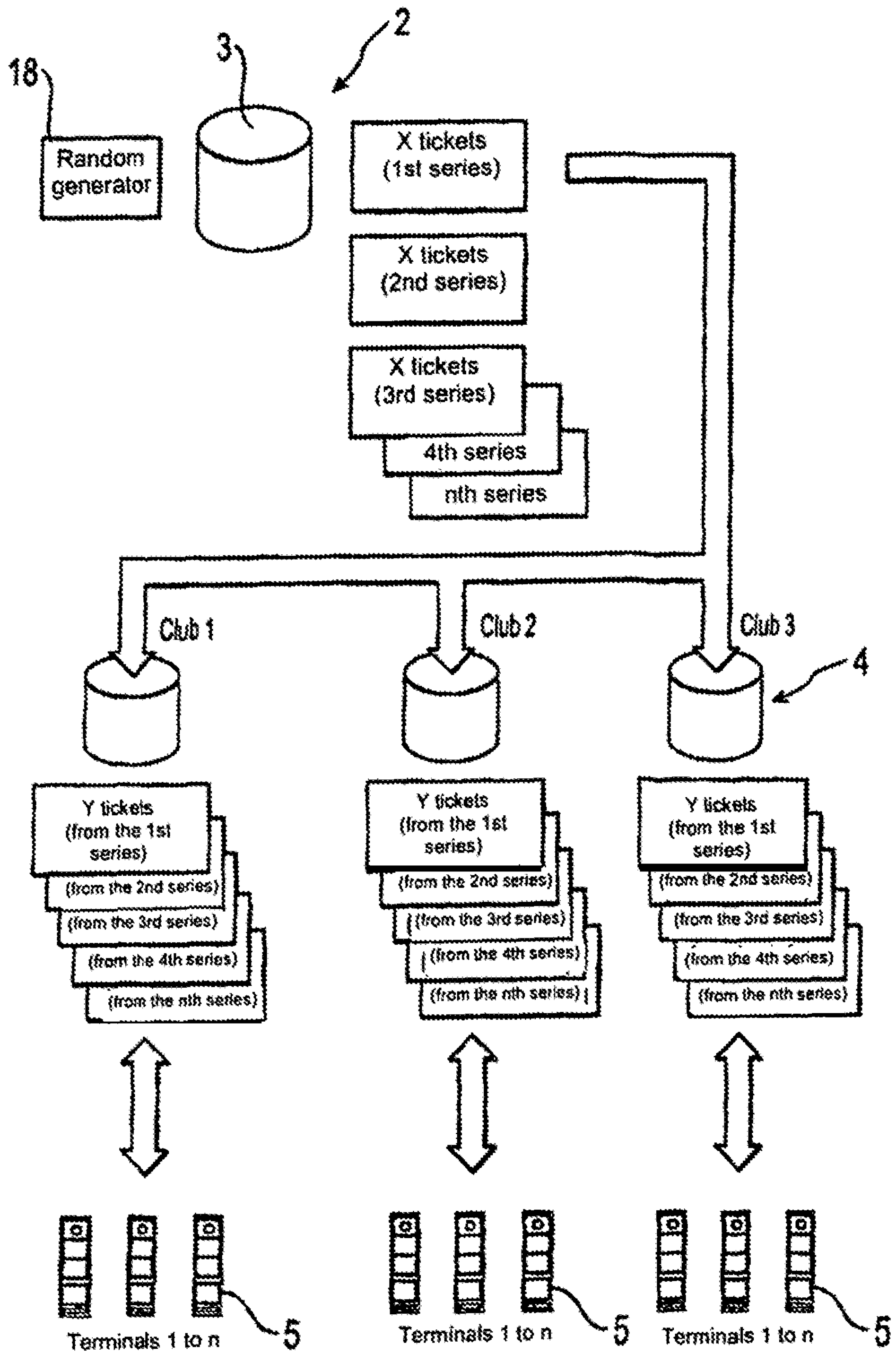
FIG. 2: a schematic representation of the electronic gaming machine similar to FIG. 1 in a design in accordance with which a plurality of local group servers are connected to a central game server, with in turn a plurality of gaming apparatus being connected to each local group server.

A plurality of local group servers 4 can be connected to the game server 2, preferably via a remote data line, and/or a remote data transfer channel and/or the network line of a global network. As FIG. 1 shows, only one single local group server 4 can also be connected to the game server 2, whereas in accordance with FIG. 2 a plurality of such local group servers 4 are connected to the game server 2.

The local group server 4 in this respect includes a local data store whose contents can be changed by communication with the master game server 2. A set of game ticket blocks can in particular be associated with the local group server 4 by a game ticket distributor which is advantageously accommodated in the central game server 2, with three different game ticket blocks a, b, c which originate from different game ticket series which are held in the master game server 2 being associated with the local group server 4 in the embodiment in accordance with FIG. 1. As FIG. 1 shows, the electronically formed game ticket blocks a, band c in the local group server 4 are each provided with a plurality of game tickets aa, bb, cc . . . nn.

A plurality of gaming apparatus 5 designed as stand-alone apparatus are connected via local network lines to the local group server 4, for example in a casino or in a gambling site, so that each gaming apparatus 5 can buy game tickets from the store of game tickets aa, bb, cc . . . nn stored on the group server 4.

A gaming machine 5 for this purpose has, in accordance with the drawn embodiment, a credit store 6 which can be loaded, for example, by inserting coins or bills or alternatively by the input of plastic money or also jetons or winning tickets or credit tickets. If the credit store 6 is sufficiently filled, a game ticket can be bought from the group server 4 at the respective gaming apparatus 5 via a purchase button 7, with its winning symbol combination advantageously being downloaded and buffered in a storage module of the gaming apparatus 5.

Figure 3:
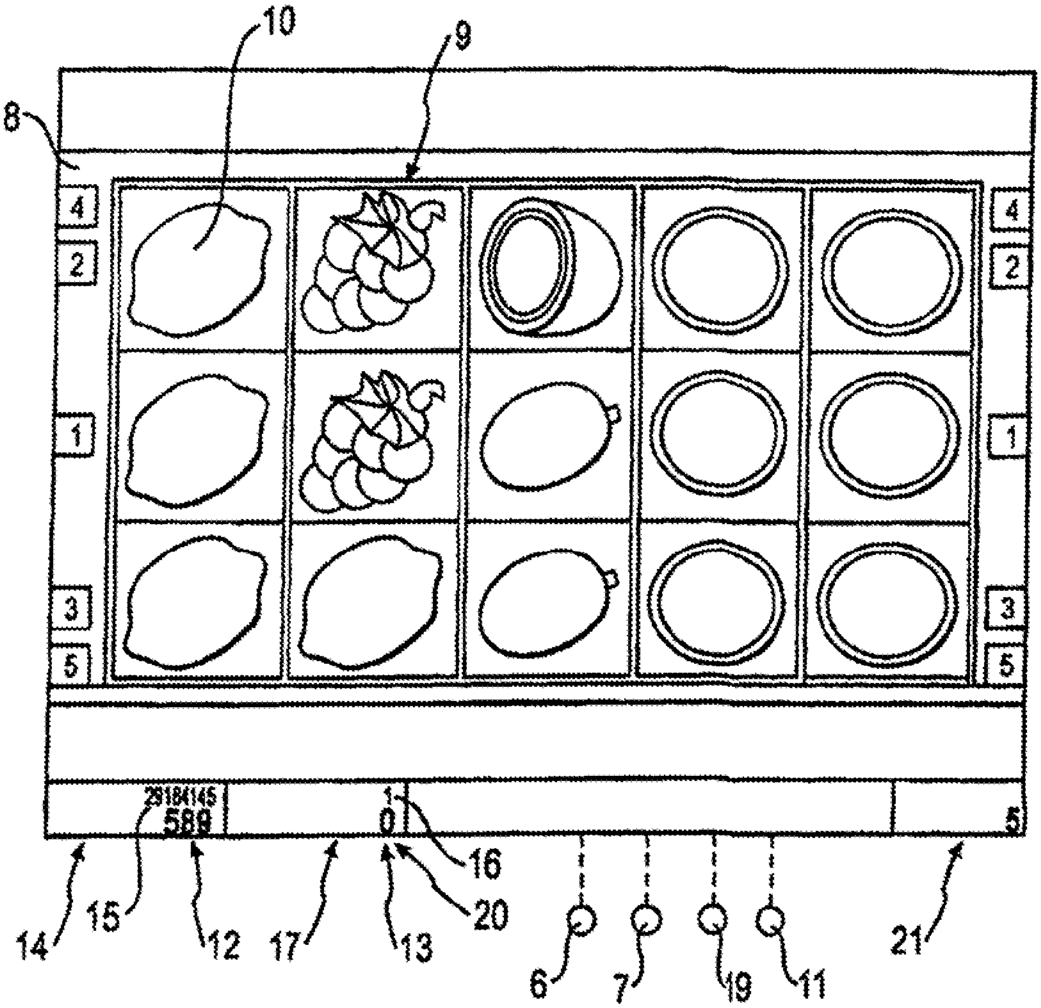
FIG. 3: a sectional view of one of the gaming apparatus from the preceding Figures which shows the display apparatus of the first gaming device and the display apparatus of the second gaming device.

A gaming device 8 of the gaming apparatus 5 is set in motion by buying a game ticket or also by subsequent actuation of a start button, said gaming device being designed as a reel gaming unit 9 in the drawn embodiment. As FIG. 3 shows, the reel gaming unit 6 includes a reel display device 10 which is divided in the embodiment shown into a plurality of rows and columns and can be designed in the form of mechanical reels, but preferably also in the form of a display for the electronic display of the gaming reels.

The gaming reels which are shown on the reel display unit 10 can be stopped or their stopping procedure can be influenced by a random generator and/or by a manually actuable stop button.

If winnings are made on actuating the reel gaming unit 9, they are written into a winnings store 11 in dependence on which at least one further game round can be activated without buying a new game ticket by a controller connected to the gaming devices 8, in particular by staking at least a portion of the winnings from the winnings store 11. In the drawn embodiment, in this respect the winning symbol combination or game ticket number is displayed in a winning symbol field 15 and the status of the credit store 6 is displayed in a credit field 12. The number of the extra rounds played and/or actuable from the winnings store are displayed in a game round field 13, with the winnings made being able to be displayed in a winnings field 20 and the stake in a stake field 21.

In the drawn embodiment, the gaming device 8 is actuable by a manual actuation apparatus 17 which can, for example, be formed as a touch screen, for example such that the displayed game rounds are touched by a finger to start a game round.

If the gaming device 8 is actuated, a winning symbol generator 18 is controlled to generate a winning symbol combination. In the drawn embodiment, the winning symbol generator 18 is accommodated in the master game server 12, with provision also being able to be made, however, to accommodate this winning symbol generator 18 in the gaming apparatus 5.

The winning symbol combination generated by the winning symbol generator 18 is read in by the gaming apparatus 5 and compared there by a win control device 19 with the winning symbol combination associated with the purchased game ticket. If the lottery number of the purchased game ticket was drawn, the winnings store 11 or its contents are increased or multiplied accordingly. If, however, a "blankn is drawn, the game round display 16 is decreased and the winnings held in the winnings store 11 are decreased or deleted. It is understood that the game round display is also accordingly decreased in the case of a win.

After making a win, it, or a portion thereof, can be consumed from the winnings store 11 by various extra chances, whereby wins can again be made. This can be done in one or more additional game rounds, which takes place on the basis of the already purchased game ticket.

If the activated number of game rounds is decreased to zero or played out, a new game ticket has to be bought to be able to play again.

I claim:

1. An electronic gaming machine comprising:

a game server for controlling a game, wherein the game server is configured to be indirectly or directly connected to at least one gaming apparatus, and wherein the game server comprises a game ticket block, and wherein the game ticket block comprises an electronic game ticket block comprising a plurality of game tickets comprising electronic game tickets with which for each electronic game ticket at least one winning symbol combination is associated, and wherein the gaming apparatus is connectable to a credit store which is associated with the gaming apparatus and which can be loaded with a credit via an input apparatus; and a ticket purchasing apparatus for purchasing a game ticket while reducing the credit loaded in the credit store, and wherein the gaming apparatus comprises a gaming device configured to receive a winning symbol combination from a winning symbol generator after purchase of a ticket and to compare the received winning symbol combination with the winning symbol combination associated with the purchased ticket, said gaming device being further configured to be actuated in dependence on a course of a game while using as a basis a data of the same game ticket in a plurality of game rounds from the credit store and then from a winnings store;

wherein in a first game round the gaming device is configured to be actuated upon reduction of the credit from the credit store and to compare a first round winning symbol combination received from the winning symbol generator with the winning symbol combination of the purchased ticket; and wherein in a second game round the gaming device is configured to be actuated upon reduction of the credit from the winning store, if any of the credit was credited to said winning store in the first game round, and comparing the second game round winning symbol combination received from the winning game generator with the winning symbol combination associated with the same game ticket used in the first game round.

2. The gaming machine of claim 1, wherein the gaming device is configured to receive a winning number combination one or more times from a winning number generator indirectly or directly connected to the gaming device, the winning number combination being able to be compared, optionally a multiple of times, with the at least one winning symbol combination of the same game ticket while staking a winnings from the winnings store, wherein the gaming device is connectable to a win control apparatus for the automatic comparison of the allocated winning symbol combination with the winning symbol combination of the purchased game ticket and decreasing, and/or increasing, and/or blocking and/or releasing the winnings stored in the winnings store by the gaming device dependent on a result of the automatic comparison of the allocated winning symbol with the winning symbol combination of the purchased game ticket.

3. The gaming machine of claim 1, wherein the gaming device is configured to be actuated only once while using as a basis the data of the same game ticket from the credit store and/or actuated further times while using as a basis the data of the same game ticket while only decreasing the winnings store and/or, actuated further times while using as a basis the data of a new game ticket while decreasing the credit store and the at least one winning number combination associated therewith can be played.

4. The gaming machine of claim 1, wherein the gaming device is designed as a reel gaming unit which can be controlled by a random generator and/or by a manually actuable control apparatus.

5. The gaming machine of claim 1, wherein the gaming device comprises a plurality of differently designed gaming units configured to actuate in different game rounds and/or configured to connect either only to the credit store or only to the winnings store such that different gaming units are configured to be used for playing different game rounds.

6. The gaming machine of claim 1, wherein the winning symbol generator is accommodated in a first control module, and the win control apparatus is accommodated in a second control modules, and wherein the first control module is connected to the second control module via a data transfer channel, and wherein the data transfer channel comprises a network line, and wherein the winning symbol generator is on the game server, and wherein the win control apparatus is on the gaining apparatus and/or at a group server connectable to the gaming apparatus.

7. The gaming machine of claim 1, wherein the at least one gaming apparatus is directly connected to the game server via a remote data line.

8. The gaming machine of claim 1, wherein the at least one gaming apparatus is indirectly connected to the game server, and wherein the gaming apparatus and game server are directly or indirectly connected to a local group server.

9. The gaming machine of claim 1, wherein the at least one gaming apparatus is connected by a local network line to a group server connected to the game server via a remote data line and/or the network line of a global network.

10. The gaming machine of claim 1, wherein the game server has a plurality of game ticket series, wherein each game ticket series comprises the plurality of game ticket blocks.

11. The gaming machine of claim 1, wherein a game ticket distributor is configured to associate game tickets from the game server with one or more group servers such that in the group server only one game ticket block including a plurality of game tickets from each game ticket series is held.

12. The gaming machine of claim 1, wherein the at least one gaming apparatus comprises a separate display apparatus configured to display the credit stored in the credit store and for the winnings stored in the winning store.

13. The gaming machine of claim 1, wherein the gaming device comprises a game round controller for controlling a number of further game rounds which can be activated by a win in the first game round, and wherein the game round controller is configured to be activated by decreasing the credit store in dependence on the number of purchased game tickets and/or in dependence on the credit held in the credit store and/or in dependence on winnings stored in the winnings store.

14. The gaming machine of claim 13, wherein the gaming device comprises a stake controller configured to control the winnings set for a game of the second game round and/or for every further game round, wherein, the stake controller comprises a manual input button and/or a stake control module controllable by the game round controller for the automatic increasing of the stake in dependence on the number of activated game rounds which can be fed from the winnings store.

* * * * *